United States Patent
Vicencio Poblete et al.

(10) Patent No.: US 10,274,677 B2
(45) Date of Patent: Apr. 30, 2019

(54) CONTROL SYSTEM AND PROCEDURE FOR CONTROLLED ACCESS BY MEANS OF AN OPTICAL DEVICE BASED ON FLAT BANDS

(71) Applicant: UNIVERSIDAD DE CHILE, Santiago (CL)

(72) Inventors: Rodrigo Andres Vicencio Poblete, Santiago (CL); Cristian Camilo Mejia Cortes, Santiago (CL); Luis Esteban Alejandro Morales Inostroza, Santiago (CL); Camilo Gonzalo Cantillano Carreno, Santiago (CL); Bastian Maximiliano Real Elgueda, Santiago (CL)

(73) Assignee: UNIVERSIDAD DE CHILE, Santiago (CL)

( * ) Notice: Subject to any disclaimer, the term of this patent is extended or adjusted under 35 U.S.C. 154(b) by 138 days.

(21) Appl. No.: 15/321,944

(22) PCT Filed: Jun. 26, 2015

(86) PCT No.: PCT/IB2015/054846
§ 371 (c)(1),
(2) Date: Dec. 23, 2016

(87) PCT Pub. No.: WO2016/139516
PCT Pub. Date: Sep. 9, 2016

(65) Prior Publication Data
US 2018/0210150 A1  Jul. 26, 2018

Related U.S. Application Data

(60) Provisional application No. 62/127,032, filed on Mar. 2, 2015.

(30) Foreign Application Priority Data

Jun. 26, 2015 (CL) .................................. 1871-2015

(51) Int. Cl.
*G06K 9/00* (2006.01)
*G02B 6/122* (2006.01)
(Continued)

(52) U.S. Cl.
CPC ....... *G02B 6/1225* (2013.01); *G06K 7/10722* (2013.01); *G06K 9/00* (2013.01);
(Continued)

(58) Field of Classification Search
None
See application file for complete search history.

(56) References Cited

U.S. PATENT DOCUMENTS 3,914,877 A * 10/1975 Hines ................. G07C 9/00055
380/54
6,570,708 B1  5/2003 Bergeron et al.
(Continued)

FOREIGN PATENT DOCUMENTS

EP  2107498 B1  7/2013
WO  2009050448 A1  4/2009

OTHER PUBLICATIONS

D. Guzman-Silva, et al; Experimental observation of bulk and edge transport in photonic Lieb lattices; New Journal of Physics; vol. 16; 2014; 8 pages.
(Continued)

*Primary Examiner* — K. Wong
(74) *Attorney, Agent, or Firm* — Lucas & Mercanti, LLP

(57) ABSTRACT

A control system for controlled access to a user by means of verifying a physical element defined in an optical and low level of power context, which includes: a setup (1) for the creation of arbitrary spatial light patterns, with control of amplitude and phase; which includes: a source of light (9) which emits a Laser beam; toward a first microscope objective (11); a spatial light modulation set (2) which receives
(Continued)

the light of the first microscope objective (11) and said spatial light modulator set (2) sends a profile modulated in amplitude and phase which form an image to a beam splitter BS (17) which divides the image into an initial CCD camera (6) and to a second microscope objective (12); a defined physical element (7) which receives the initial image from the second microscope objective (12), and transmits the image without diffracting it as a final image to a third microscope objective (13); a final CCD camera (8), that receives the final image of the third microscope objective (13) and sends it to a computer (300) which compares that final image with the initial image, and performs a calculation of similarity between both images to decide to grant access to the user, if the similarity is greater than a predefined value, and deny it if the similarity is less than a predefined value; a control procedure of controlled access which compares a pattern of dots transmitted through the defined physical element, which code the numbers 0 to 9 and decides to grant or deny access if it matches with the key entered by user.

17 Claims, 9 Drawing Sheets

(51) Int. Cl.
*G06K 19/00* (2006.01)
*G06K 7/10* (2006.01)
*G06K 19/06* (2006.01)
*H04N 9/31* (2006.01)

(52) U.S. Cl.
CPC ....... *G06K 19/00* (2013.01); *G06K 19/06037* (2013.01); *H04N 9/31* (2013.01); *G06K 2007/10485* (2013.01); *G06K 2019/06253* (2013.01)

(56) References Cited

U.S. PATENT DOCUMENTS

| | | | |
|---|---|---|---|
| 6,865,001 B2 * | 3/2005 | Long | G03H 1/041 |
| | | | 283/86 |
| 2007/0188838 A1 | 8/2007 | Chao et al. | |
| 2014/0183269 A1 | 7/2014 | Glaser | |

OTHER PUBLICATIONS

R. A. Vicencio, et al; Observation of bound states in Lieb photonic lattices; 5 pages (Publication submitted to Physical Review Letters; Dec. 2014).

International Search Report dated Dec. 1, 2015 for PCT/IB2015/054846 and English translation.

* cited by examiner

CONTROL SYSTEM AND PROCEDURE FOR CONTROLLED ACCESS BY MEANS OF AN OPTICAL DEVICE BASED ON FLAT BANDS

CROSS REFERENCE TO RELATED APPLICATION

This Application is a 371 of PCT/IB2015/054846 filed on Jun. 26, 2015, which claims priority of U.S. Provisional Application No. 62/127,032 filed Mar. 2, 2015 and Chilean Patent Application No. 1871-2015 filed Jun. 26, 2015, all of which are incorporated herein by reference.

FIELD OF THE INVENTION

The invention consists in the use of photonic crystals with non-conventional geometries (having at least one flat band) to grant or deny a controlled access to a place, device or information. Using the properties of photonic crystals or other periodic systems, it is possible to form images and patterns that do not diffract nor are destroyed, carrying information in a trustworthy manner from one end to the other of the photonic crystal or other periodic systems, regardless of the distance of propagation. The reliable transport of information is a critical problem in any technological system. The present invention describes a solution to the problem of granting or denying a controlled access to a place, device or information, through the identification, by means of the test of a physical element defined, wherein said physical element is a periodic system of transport of light, in an optical context of low power level, by which is possible to form images that do not diffract nor are destroyed, such as in a photonic crystal of non-conventional geometry.

The present invention operates at low level of power since it uses only linear properties of these crystals, being more economical, and at the same time, presenting a large spatial flexibility since it does not depend on a specific region or pattern, in a completely homogeneous and periodic array. The modification of the geometry from a conventional photonic crystal to a non-conventional one generates profound changes in linear properties, and consequently in the propagation of light through them.

In general, non-conventional systems have a set of dispersive and flat bands, being these latter keys to the present invention. All photonic crystals presenting at least one flat band are candidates for the implementation of this invention. In practical terms, the reliable propagation of the image in the photonic crystal with flat band, serves as a method for checking some pattern to propagate. Without the presence of the crystal the image does not propagate and is not recognized and therefore the logic circuit is not activated. The presence of the photonic crystal and the correct propagation of a pattern to recognize, constitute an optical method of recognition, for example, a user. As a practical example, 10 different patterns were chosen, that are associated with the numbers 0 to 9. A sequence of these patterns (numbers) are propagated in the crystal, obtaining a sequence of images in a CCD camera, (Charge Coupled Device). Subsequently, these 10 images are analyzed and recognized in a computer associating a respective number to each pattern. A sequence of N patterns constitutes a key (password) that grants or denies access to a device, place or information to a user.

STATE OF THE ART

The propagation of images/patterns located in periodic photonic crystals presents, essentially, two practical solutions, although with the same fundamental idea behind. The first theoretical idea consists in the creation of waveguides in non-homogeneous photonic crystals (via doping of the material in a particular region or via a variation of the geometric parameters, usually referred to as impurity or imperfection), which would allow propagating a specific pattern that would be determined by the spatial distribution of the non-homogeneous crystal. Publications were not found to have tried this theoretical idea in practice. However, a different idea in form, but similar in the substance, is the one developed by J. Yang (2011). Through the non-linear response of a material is possible to create non-homogeneous zones in places where the optical intensity is higher. In this case, the non-linear properties allow the self-localization of the light by locally increasing or decreasing (depending on the application) the refractive index and making the light to propagate following these self-induced patterns. These authors have demonstrated the propagation of images in non-linear photonic crystals, which has a strong dependence on the phases and the pattern itself provided that the propagation is stable over a long distance. In general, non-linear responses of the materials are observed in propagating high power light, so that it would be economically less favorable. Additionally, the spread of arbitrary patterns, complex, will not necessarily be dynamically stable, due to multiple resonances that appear in a non-linear context and the natural increase of the complexity of the system (it could even be chaotic). Thus, as exposed in the work of J. Yang (2011), it could be observed a propagation of complex images in very limited/short distances, which would restrict their use in practice when trying to propagate over distances greater than one centimeter.

The present invention describes a solution to this problem, using the special linear properties of certain homogeneous photonic crystals, with an origin in a non-conventional particular geometry, but without optical power requirements nor distance of propagation. This makes the solution described in the present invention more economical, and at the same time more flexible by not depending on a region or specific pattern, nor length of propagation, in a completely homogeneous and periodic photonic crystal. In other words, the composed images could be transmitted in different regions of the photonic crystal and for arbitrary distances, due to the fact that these images are exact solutions (propagating modes) of the system.

Within the prior art the documents related to the present invention are the following:

Patent application WO2009050448A1 presents a method to build an optically variable security device. In this method, the material of a photonic crystal is supplied and a process is carried out in the material, causing deformation thereof to form a first region (A) by which the incident light that is received by the crystal is selectively reflected or transmitted to generate a first optically variable effect. In a second region (B) the received incident light generates an optical effect, different from the first optically variable effect.

The publication "Image transmission using stable solitons of arbitrary shapes in photonic lattices" (Optics Letters 36, 772 2011) discloses a transmission of images using stable solitons of arbitrary shapes in photonic crystals, demonstrating theoretically and experimentally that photonic lattices under defocusing non-linearity support gap solitons in varied shapes such as crosses and H-shapes. These solitons, whose peaks of intensity are in phase, are stable before perturbations, so that they are propagated robustly through the lattices. Based on this, it is proposed the transmission of images or text based on solitons through non-linear photonic structures.

The publication "Non-diffractive propagation of light in photonic crystals" (PHYSICAL REVIEW E 73, 016601 2006) mentions the non-diffracting propagation of light in photonic crystals, which investigates the non-diffracting propagation of electromagnetic radiation, including visible light, through materials with a periodic spatial modulation of the refractive index, i.e. through photonic crystals. The regimes are analytically and numerically calculated wherein the dominant diffraction is voided; i.e., light beams of arbitrary width are propagated without diffractive spreading and, equally, arbitrary patterns of light can propagate without damage by diffraction. The propagation of subdiffractive light is investigated, wherein the propagation is governed by the fourth highest diffraction order, when the dominant diffraction order is voided.

The results of the patents and publications search carried out show concepts, in general, isolated that, by simple inspection, could not be trivially be combined to generate the disclosed innovation.

For example, publications and patents were found relating to the propagation of images, which can occur in various contexts, independent of the type of radiation and the transmission medium. Regarding to photonic crystals, there is a huge diversity of possible applications and/or modifications to these systems for controlling their propagation properties and/or data transmission; however, no indication was found about perfect transmission of images. Lastly, systems with flat bands are theoretical models known several years ago, with very few experimental corroborations to date. In the publication of Guzmán-Silva (2014) the properties of transport in a photonic crystal with flat bands were studied, such as Lieb's. Also, the concept behind the present invention was outlined, about the propagation of localized modes and the formation of images using the non-diffracting properties of the modes belonging to the flat bands.

The physical contexts in which this invention would be applied are all that can be described as waves and in which some kind of restriction or periodic potential can be implemented. To cite a few: Transport of electrons in crystals (control of electrical conduction properties), spins in crystalline structures (magnetic information storage on hard drives), cold atoms in optical lattices (spatial control of atoms at very low temperature, basis for an atomic laser), etc. On the other hand, in general, the photonic crystals will not propagate images without destroying them, unless they are manufactured with a particular non-conventional geometry. For this, it is absolutely mandatory having a periodic system (ordered and repetitive sequence of a base element) presenting a linear spectrum (relationship between energy and the speed of propagation of the waves that are linear solutions of the system) with flat bands (region of the linear spectrum in which the energy of the waves is constant regardless of its transversal velocity), so as to count with linear modes (solutions of the linear periodic system) that propagate without diffracting and that are highly degenerated (vast set of linear modes with equal value of energy).

In general, the search of the prior art carried out led to very different results in respect of those that effectively relate to the present invention. There are various systems of transmission of optical images; however, if sending images via a specific photonic crystal is wanted, this would require a special engineering thereof or the excitation of non-linear effects in the material. It is known that it is not possible to send an image from one end to another in a conventional photonic crystal (with dispersive bands only and with a standard geometry: rectangular, hexagonal, graphene, etc.) without this being destroyed due to the intrinsic dispersion of waves that are propagated in this medium.

It is well known that when sending an image from one end to another through a conventional photonic crystal (dispersive) this image is destroyed due to the intrinsic dispersion of the linear waves that are propagated in this material, so, there is the need of counting with a verification mean, in which when light passes through said material, it is not diffracted. Therefore, it is presented a system of emission and reception of electromagnetic waves passing through a photonic crystal (non-conventional), with the purpose of transferring said electromagnetic waves in a specific pattern.

In this way, the present invention describes the way to achieve the combination of these modes consistently, and sending along the crystal composed images so that they do not suffer distortion by transmission to arbitrary distances (reliable propagation).

The solution described in the present application consists in the use of new geometries (non-conventional, in which flat bands are observed) in which is achieved a change in the spectrum of solutions and a set of system modes are propagated without diffracting. This is not obtained by chance, but it requires a specific geometry that meets the conditions of a system with flat bands; this is, destructive interference, or phase cancellation along the crystal.

SOLUTION TO THE TECHNICAL PROBLEM

The invention exposed here describes a system of controlled access, using a reliable propagation, of images/composites, to arbitrary distances, as a linear combination of localized modes from the flat band of a non-conventional photonic crystal. The present invention presents a solution to the problem of propagation without diffraction of images with a geometry determined by the topology of the used specific photonic crystal.

The photonic crystals are optical structures, specially manufactured, in which the refractive index (main optical property of a material) is modulated spatially, being greater in the area of light conduction (waveguides), and with a pattern that is repeated periodically (forming a crystalline structure). The main functionality of these devices is to control the propagation of light using linear properties which arise as a result of the particular geometry of each crystal (it is sought making a simile of the advances in electronics, but with photons instead of electrons). A typical example is shown in FIG. 1(a). The differences in refractive index between the waveguide and the surrounding bulk material can be very small (of the order of $10^{-4}$ or $10^{-3}$), which ensures that each waveguide is essentially mono modal and thus allowing the propagation of light in terms of its lowest linear spectrum, based on combinations of fundamental mode of each one of the waveguides conforming the array. The solutions (global system modes or super-modes) are determined by the dispersion relation $\beta=\beta(k_x,k_y)$, also known as band structure or linear spectrum of the system [see FIG. 1(b)]. Depending on the geometry of the crystalline structure (waveguides array), combinations of the modes of each waveguide will give rise to various super-modes of the array, which for conventional geometries will cover almost all the photonic crystal; i.e., the linear modes of a typical system (conventional) will be spatially delocalized and will occupy a large part of the area of the crystal [see examples in FIG. 1(c)]. Any periodic system has, in principle, an infinite set of "bands and gaps", defining thus, the regions where there are propagating solutions (bands) and where there are none (gaps). All global modes have a propagation constant β belonging to some band of the system. If an attempt to propagate an image or pattern located in these crystals were to be made, it would simply be destroyed due to the simultaneous excitation of various spatially extended modes, which belong to the different bands of the system; in addition, these modes have different constants of propagation and coefficients of diffraction different from zero (non-zero curvature of the bands). Thus, the propagation of light is presented in a completely incoherent form in space, with many excited diffracting modes. FIG. 1(d) presents two numeric examples of propagation, in which a profile initially located in a single or 4 waveguides of the photonic crystal (above, incident profile) is destroyed (diffracts) completely when propagating along the photonic crystal (down, outgoing profile after a distance of arbitrary propagation).

By modifying the geometry of the photonic crystal in a non-conventional form (non-typical), linear properties of these can dramatically be changed. For example, if some waveguides of a crystal of rectangular geometry were orderly and periodically removed, a new photonic crystal can be constructed, known as "Lieb lattice", as the one shown in FIG. 2(a). In this way, new linear properties arise [see FIG. 2(b)], such as having a linear spectrum with two dispersive bands [with extended modes as shown in FIG. 2(c)], and a completely flat band (zero curvature). The global modes belonging to this flat band look like "rings", composed of four sites with the same amplitude but with a phase difference π between neighboring amplitudes [see FIG. 2(c)-Down-right]. These modes can be located in any region of the photonic Lieb lattice, whenever there is a set of closed sites (square of 8 sites) in the array. These modes have zero diffraction, due to the zero curvature of the flat band to which they belong; therefore, they are completely static in the transverse direction of the crystal. In addition, all these modes have exactly the same propagation constant (β=0) and, therefore, any linear combination of them will be completely coherent, which will preserve any combined pattern up to the end of the propagation system. That is to say, a composed initial image injected in the incident facet of the photonic crystal, will be stably propagated throughout it, observing the same image at the end of the crystal [see FIG. 2(d)-Right]. In addition, we see how, exciting the Lieb lattice with an initial condition located centered on a single waveguide, the generated light pattern diffracts through the glass due to the excitation of the dispersive bands. This reinforces the concept of images formation as combination of the non-diffracting rings belonging to the flat band of the photonic crystal.

Examples of photonic crystals that present this type of flat band property are Lieb, Kagome, Sawtooth, Stub lattices, among others. All these geometries have a property in common with regard to the minimum description of the periodic structure (unitary cell): the unitary cell is composed of at least two sites with different interactions at short range. Therefore, there is a certain degree of asymmetry in the coupling/interaction, which produces a geometric distinction between these sites and, therefore, different linear properties associated to each one. All non-conventional crystals presenting at least one flat band would be good candidates for implementing this concept of information transmission. The main focus of the present invention is in sending optical information using the linear localization properties of these systems; however, the present solution covers all periodic system with non-conventional geometries, independent of their physical nature (we can observe a similar phenomenology for electrons, cold atoms, phonons, photons, etc.; wherein the main features are the non-conventional geometry of the lattice and a particle behaving as a wave). This solution can be applied in electronic systems, cold atoms in optical lattices, spintronics, arrangements of quantum dots, arrangements of micro oscillators, arrangements of micro pillars, chains of proteins, etc.; in general, in all physical systems presenting periodic restrictions.

In particular, inventors have focused on the use of the Lieb lattice. This was mainly due to the strength of their linear properties. Unlike Kagome or Sawtooth, the natural anisotropies of materials or the manufacturing process of the photonic crystal do not modify the linear properties of the Lieb lattice. Both Kagome and Sawtooth lose the flat band if the distances and/or orientation of the waveguides are not finely built. The typical experimental implementations, such as the manufacture of different arrangements via burning a silica glass with femtosecond lasers [see FIG. 3(a)], produce arrangements with non-symmetrical waveguides, but with an elliptical geometry, which induce a greater effective coupling in the ellipticity direction. However, the Lieb lattice is robust when considering anisotropy, preserving the flat band but with a localized mode of asymmetrical profile, depending on the ratio between vertical and horizontal couplings (determined by the ellipticity of the waveguides).

Below the results that have been published recently are exposed. First, these concepts are tested in a realistic context to perform a set of numerical simulations in similar conditions to the experiment, for identifying the possibility of transmission of localized modes in a real photonic crystal. The main difference with the exposed above relates to the approaches used to understand the linear properties of these crystals. The exposed above considered a weak interaction between neighboring waveguides in which interactions at the longest range are neglected, obtaining the results presented in FIG. 2, which are the basis of the present invention. However, when studying the system from a more realistic point of view, the interaction with distant sites is not necessarily null or negligible and may induce changes in the bands structure, being able to lose the flat band and, therefore, the localized modes in which is based the concept of the present invention. In this way, it is crucial to find the appropriate experimental conditions to observe the foretold phenomenology within a weak interaction approximation. For this, a set of numerical simulations was developed looking for the optimum conditions for the propagation of these modes in a photonic crystal, which involves the numerical integration via a "beam propagation method" in an optical potential with the geometry of Lieb. In FIG. 3(b), it is noted that the refractive index is constant in the region between the waveguides and it grows rapidly/abruptly in the waveguides region. The relevant parameter to identify is the contrast of refractive index, which is necessary to propagate the localized modes. This contrast is defined as the difference between the refractive index between waveguides and the maximum in the waveguide itself. The manufacture of photonic crystals via femtoseconds lasers, allows a contrast between $10^{-4}$ or $10^{-3}$. Being very small, this ensures that the waveguides will have essentially only one mode and that the initial approximation (weak interaction) will be very faithful to what is observed in the experiment, depending on, of course, the parameters thereof. By performing several simulations, it is determined that a good propagation of localized modes occurs starting from a contrast of 0.65×

10^-3. FIG. 4 shows a set of simulations performed for a contrast of 0.7×^10−3, in order to ensure a good propagation of localized modes.

It was numerically studied how the light diffracts by injecting light into a single central waveguide (bulk excitation), in the input facet of the crystal. In FIG. 4(a) diffraction is observed (spatial dispersion), mainly vertical due to the anisotropy caused by the ellipticity of the waveguides, through the photonic crystal. On the other hand, FIG. 4(b) shows the final image injecting an initial condition corresponding to a symmetric ring of Lieb (four points of light with difference of phase π). An excellent propagation of this ring is observed, with a perfect localization and manifestation of the anisotropy of crystal in the asymmetry of the output amplitudes of this ring. In FIG. 4(c) was proven the importance of the phase structure in the perfect propagation of the ring, since in this case the initial condition were four amplitudes all in phase. It is observed how the profile diffracts and loses its initial location. Finally, FIG. 4(d) shows the possibility to superimpose localized modes, so as to generate more complex patterns as a result of a coherent linear combination. It is observed how the combination "sum" of two rings has perfect propagation, with a central site more intense due to the addition of amplitudes at that position. Other combinations were also studied, and all of them showed an excellent propagation of the incident image up to the output facet of the crystal. Simulations performed for a larger propagation distance, show the same phenomenology, wherein destruction of the patterns is non-existent and therefore the images are preserved to long distance propagation.

It is experimentally shown the possibility of creation of arbitrary optical images, as well as the propagation of these in a photonic Lieb lattice. As the first challenge, an experimental setup (1) was developed for the creation of arbitrary spatial light patterns, with simultaneous control of amplitude and phase. FIG. 3(c) represents an experimental scheme developed for this invention. The key element of this setup is the use of a spatial light modulator (SLM) (16). For example, it was used one of Holoeye brand, model LC2012, which allows modulating the amplitude and the phase of an optical field, previous calibration of the device and the critical use of a set of polarizers and retardants of waves, depending on the specific modulation to perform. In the setup developed in the present invention, amplitude modulation was performed first generating, from a broad optical beam, a profile of amplitude corresponding to a set of localized beams/dots, which in the case of the Lieb lattice correspond to 4 points of light (ring) in the geometry of this crystal. This profile modulated in amplitude is, then, modulated in phase to achieve the desired optical structure, related with the particular experiment. Subsequently, this pattern/image of light is optically carried to the incident face of a photonic crystal (7) of Lieb as shown in FIG. 3(b). Using this procedure, different images can be generated and propagated through any photonic crystal inserted into the developed experimental setup. Using a CCD camera (6) the initial input image to be propagated can be observed to check its amplitude and phase structure. Then, by using a final CCD camera (8), the output facet of the photonic crystal is observed with a computer (300). The coincidence of this image with the initial condition generated is compared, thus determining whether the propagation has been reliable or not, using a calculation of the so-called similarity (this calculation refers to the comparison between the initial image and the output image), and also via direct observation of the final image. In FIG. 5 some of the experimental results obtained are grouped. FIG. 5(a) shows diffraction across the array for single-site excitation in the center of the photonic crystal, which excites the dispersive bands producing absence of localization. FIG. 5(b) shows the image obtained for the propagation of the ring mode of Lieb lattice, which includes the difference of phase π among amplitudes of the neighboring ring. Clearly, the propagation of the ring is stable, non-diffracting, and almost identical to the realistic simulation [FIG. 4(b)] and approximate simulation [FIG. 2(d)]. The calculation of similarity for the propagation of several rings in different regions of the photonic crystal gives us an average value of similarity of an 83% between the initial condition and the final image obtained after propagation. A value of similarity of over 75% is considered by the inventors as good, so it can define a propagation as reliable. This value would be higher if as initial condition an asymmetric ring in amplitude would be injected. However, experimentally it is seen that this has no impact on the obtained final image, being much simpler the creation of a symmetric image as an input condition. For experimentally testing the dependence of the phase structure, an initial condition of four in phase points of light was prepared. The obtained result is shown in FIG. 5(c), observing a large diffraction and destruction of the injected initial profile. To complete the comparison with the numerical results, we proceeded to prepare an initial condition that consists of the sum of two rings in the vertical direction. In FIG. 5(d) is observed how the propagation of this image is perfect and very similar to the obtained numerically [FIG. 4(d)]. This is a proof of the existence and concrete possibility of excitation of the ring modes and the certain ability of generating linear combinations of these modes to create more complex images that can be transmitted in an arbitrary distance, concept in which the present invention is based on.

Finally, after displaying and verifying the real possibility of observation of the fundamental properties of photonic crystals with flat bands (aside from the Lieb lattice, also tests were performed with Kagome, Sawtooth and soon with Stub lattices), more complex combinations of localized modes (patterns or images) were constructed in the Lieb lattice. Some examples are presented in FIG. 6. The possibility of combinations and, therefore, of different intensity patterns is of 34 combinations. That is to say by the propagation of these composed images, more than 34 different patterns that can define a way of optical coding are generated. The test was conducted to define 10 different patterns (ten different linear combinations of 4 ring modes in the Lieb lattice) and associate them with the numbers from 0 to 9. It was constructed a database with 4-digit numerical keys (e.g.: 1234) and the test to write the key was made, generating and propagating the four images associated to these 4 numbers, recording the respective images and analyzing them to determine if they match with the patterns stored in a database that are associated to these numbers. If the match is greater than a minimum value of defined similarity (P value), for example P=75%, it is considered a correct match and it recognizes the entered key, generating an OK in the circuit that grants access. That is to say, it has been demonstrated that it is possible to use the non-diffracting propagation of images in photonic crystals having flat bands for sending reliable information from one end to the other, and additionally, use it as a system for controlled access. Without the presence of the photonic crystal, recognition would never exist. The present invention proposes an additional verification system that reinforces the security of any access system. The controlled access consists in allowing access to a user to a place, vault, open safety doors, access to encrypted information, or any other desired controlled access. A modality of the present invention is to use the combination of four localized rings (FIG. 7(a)), in a square region of the Lieb lattice; i.e., forming a non-diffracting image via the combination of four modes of the flat band (rings), one in each quadrant (FIG. 7(b)). All the rings have equal frequency, therefore, the combination is fully coherent. As the luminous pattern has amplitude and phase, it can perform different combinations of these rings. As the combination implies the superposition of rings in amplitude and phase, in the demarcated central region (FIG. 7(b)) there may or may not be light. Each central square can have light or not, i.e. it can be labeled by a zero (0) or one (1). In total it has 2×2×2×2=16 possible combinations via the combination of 4 non-diffracting rings with different phase relation (FIG. 7(c)). For constructing the access code, this is configured according to the 10 best combinations (more symmetric experimental images) to associate each pattern to a number from 0 to 9. In the process of recognition, when the final image is taken by the CCD camera (8), the presence or not of light in these four demarcated regions was analyzed, determining the transmitted number defined as a sequence of zeros or ones. Thus, a code of arbitrary length can be propagated in the photonic crystal, and be recognized within a database, giving a recognition of a stored user. In summary, the present invention describes and shows in examples the concept of propagation of images in photonic crystals of flat bands, wherein the Lieb lattice is an example, and works in a good way in realistic conditions, as it has been proven numerically and experimentally. In principle, this concept operates in any system that presents flat bands, as long as they meet the respective experimental conditions. This concept of generation and observation of localized states from the particular geometry of systems with flat bands has a broad spectrum of physical systems in which applications can be found. The concept of the present invention embraces any system that uses the propagation of waves in periodic crystals, which can occur for the light, for electrons, for cold atoms, for oscillators in general, for spintronics, quantum dots, or other physical systems subjected to periodic restrictions.

DESCRIPTION OF THE FIGURES

The group of FIG. 1 shows the typical properties and phenomenology in conventional lattices without flat bands.

FIG. 3. (A) Manufacturing technique of photonic crystals writing waveguides in arbitrary positions, when burning the surrounding material (silica) in defined places. Thus, the refractive index of the material changes and allows the creation of a waveguide for light conduction. (b) Microscope image of a Lieb array designed in Chile and manufactured in Germany, with 341 waveguides and a separation between neighboring waveguides of 20 micrometers. (c) Experimental setup for the creation of the initial image and the study of its propagation along a photonic Lieb lattice. The group of FIG. 4 shows realistic numerical simulations of the propagation of different initial conditions in the photonic Lieb lattice.

The group of FIG. 7 shows an outline of combinations of four rings of Lieb, including the form of measurement of light (1) or no light (0) in four regions well demarcated.

DETAILED DESCRIPTION OF THE INVENTION

Figure 1:
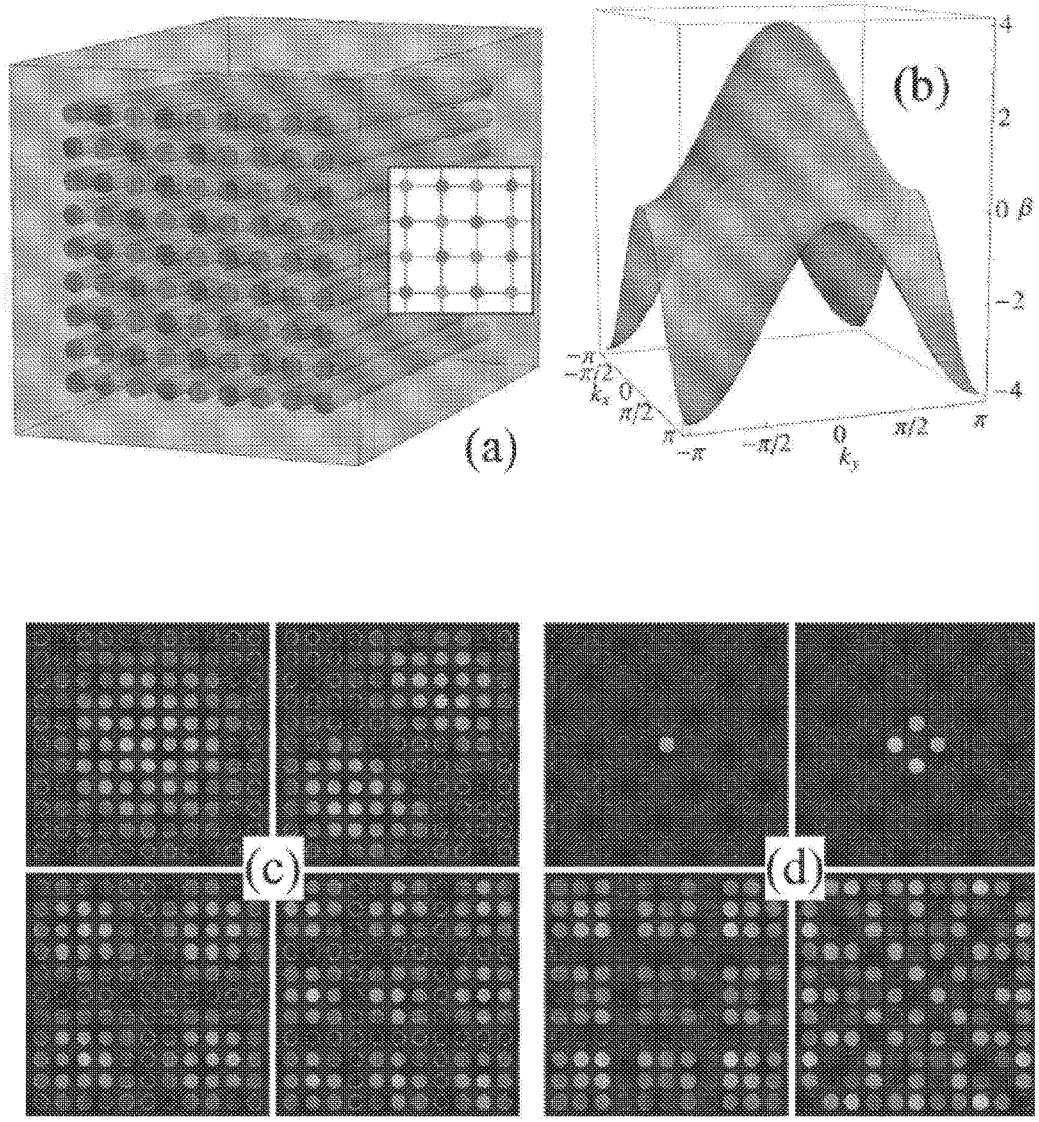
FIG. 1: (a) Three-dimensional outline of a photonic crystal of "rectangular" geometry. Waveguides are drawn in gray (cylindrical tubes), while the surrounding material in another shade of gray. Inset: Cross section of this crystalline structure, in which the horizontal and vertical distance between waveguides (circles) is identical (the lines are only visual aids for demarcating the interaction between closest waveguides). (b) First band for a photonic crystal of rectangular geometry. (c) Examples of global modes of the rectangular photonic crystal. (d) Profile of diffraction (below), for an arbitrary propagation distance, for two different initial conditions (above), for a rectangular photonic crystal. In (c) and (d) the scale of intensities grows from the black one through the gray one to the white one. The group of FIG. 2 shows the properties and phenomenology of the non-conventional Lieb lattice.
Figure 2:
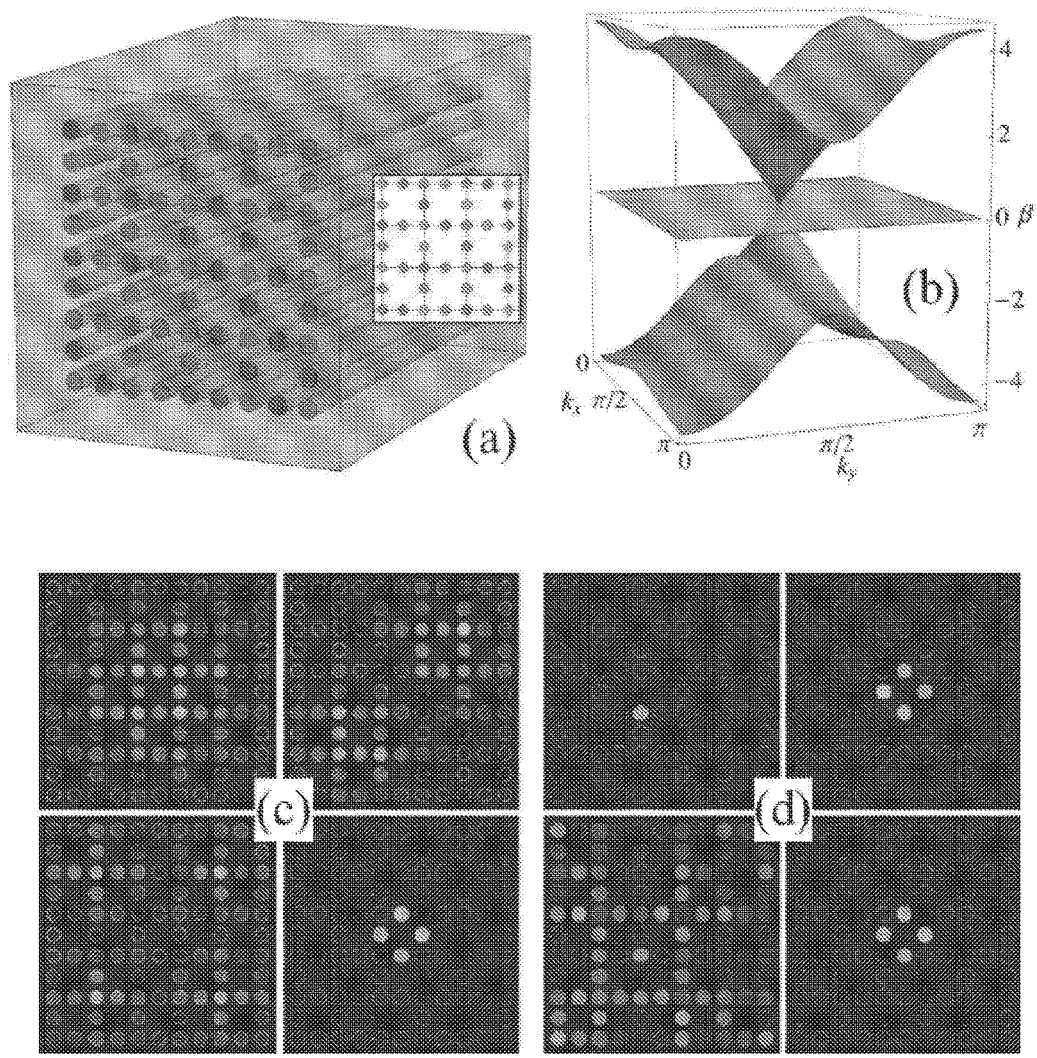
FIG. 2. (a) Three-dimensional outline of a photonic crystal of isotropic "Lieb" geometry. The waveguides are drawn in gray (cylindrical tubes), while the surrounding material in another tone of gray. Inset: Cross section of this crystal. (b) Band structure for a photonic Lieb lattice. (c) Examples of global modes of photonic Lieb lattice, which cover a large part of the array, except the ring belonging to the flat band [flat surface at (b)]. (d) Profile of diffraction (below) for two different initial conditions (above), for a photonic Lieb lattice.
Figure 3:
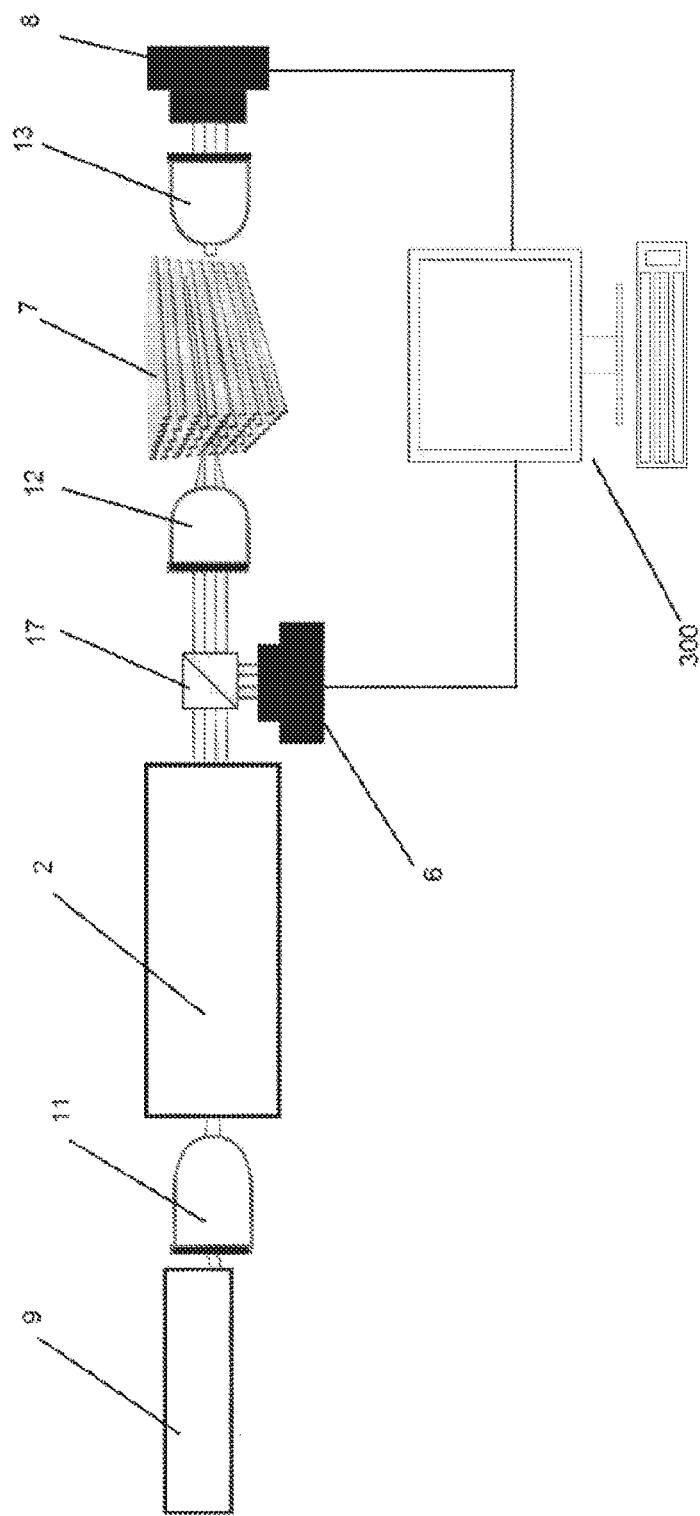
FIG. 3 shows a preferred configuration of setup for the physical element defined (7) in which this invention is implemented. The group of FIG. 3 shows the experimental manufacture and setup technique for the photonic Lieb lattice in which this invention is implemented.
Figure 3A:
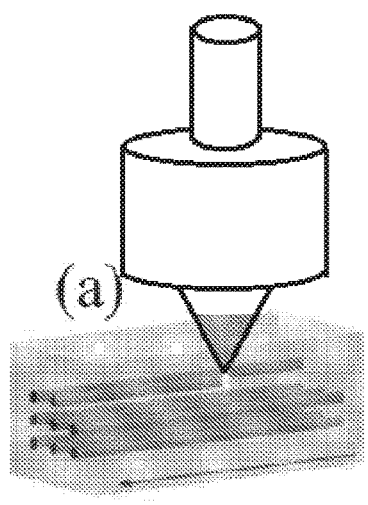
Figure 3B:
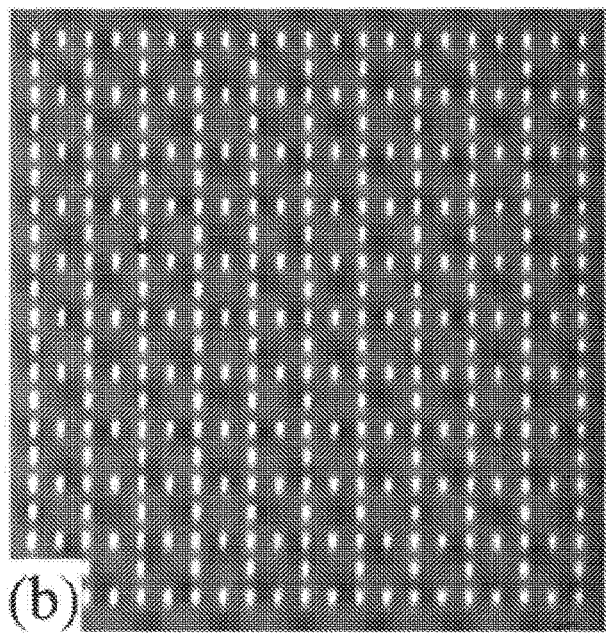
Figure 3C:
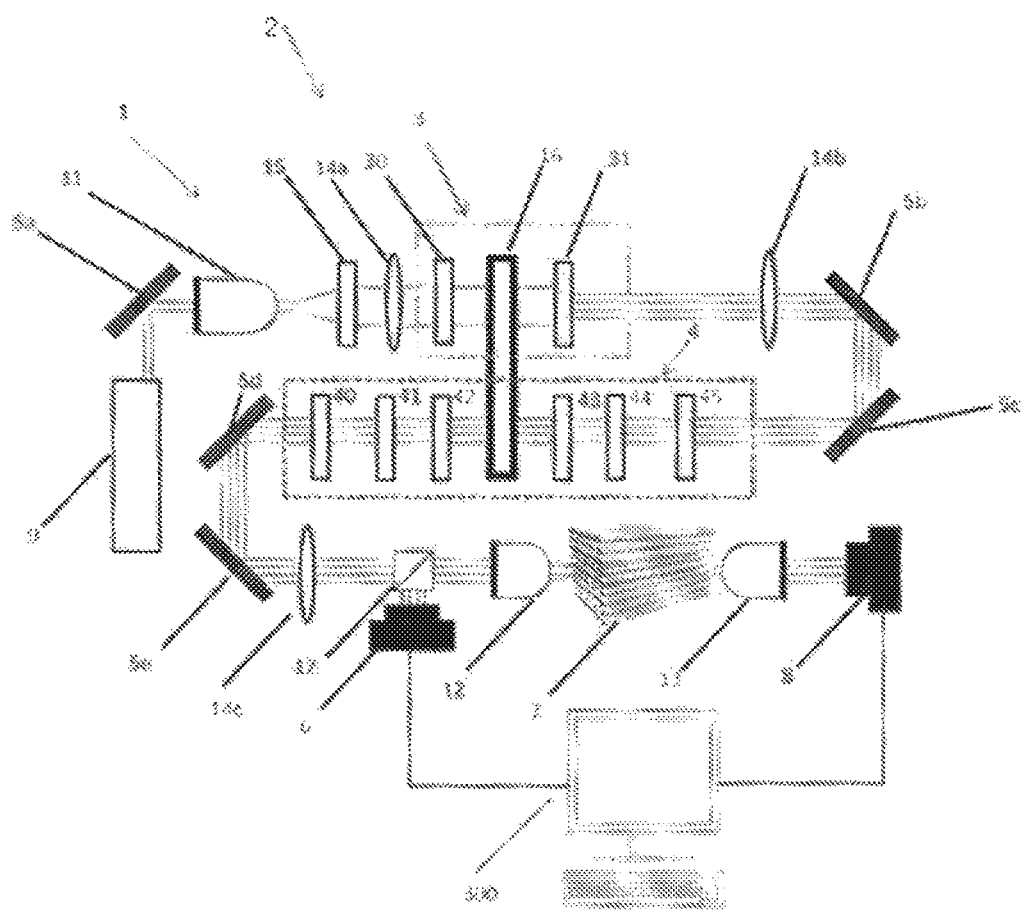
Figure 4:
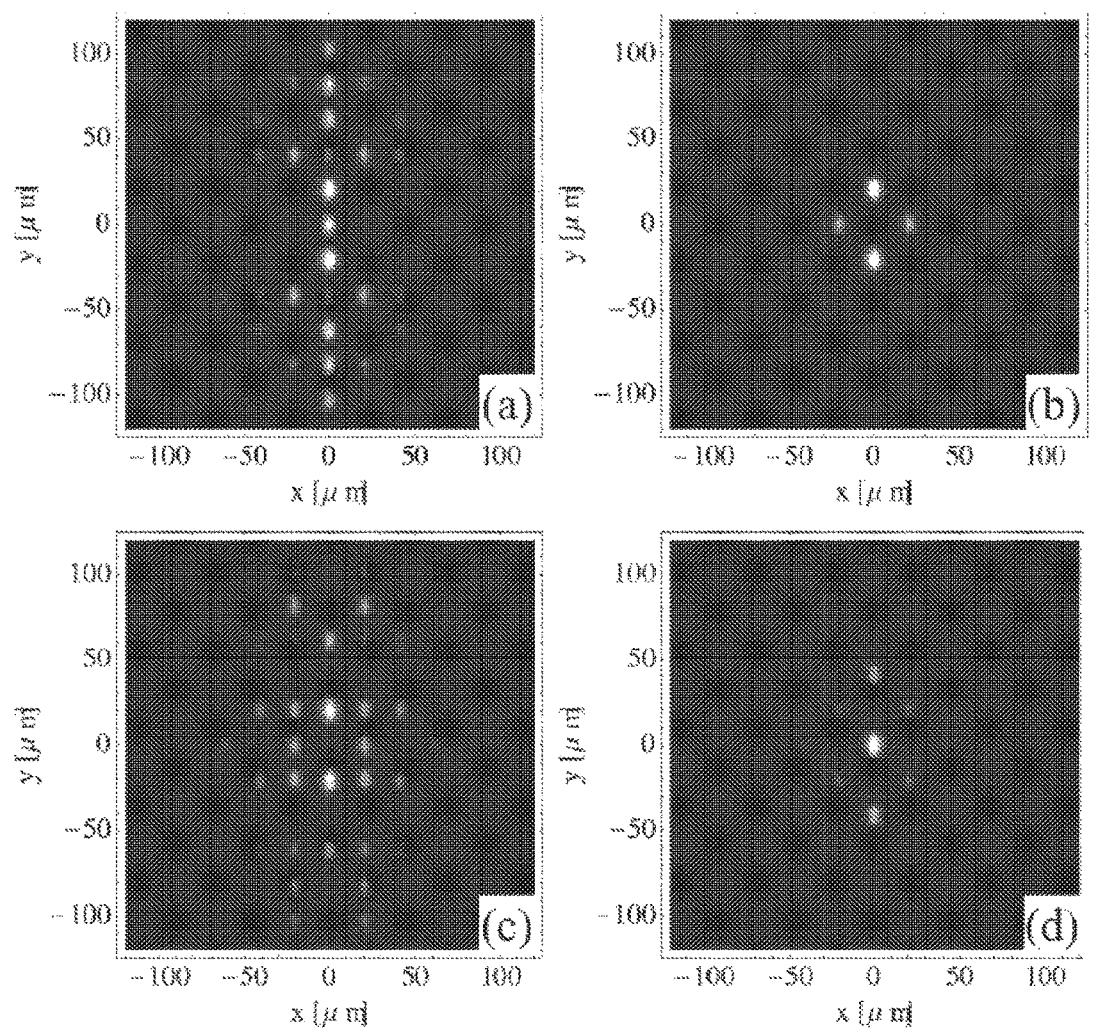
FIG. 4. Numerical simulation of intensity patterns at the output of a Lieb lattice for different initial conditions: (a) Central excitation of a single waveguide, (b) Four sites with phase difference $\pi$ (Lieb ring), (c) Four sites without phase difference, and (d) two rings added. Wavelength $\lambda=532$ nm. The group of FIG. 5 shows experimental images of the propagation of different initial conditions in the photonic Lieb lattice.
Figure 5:
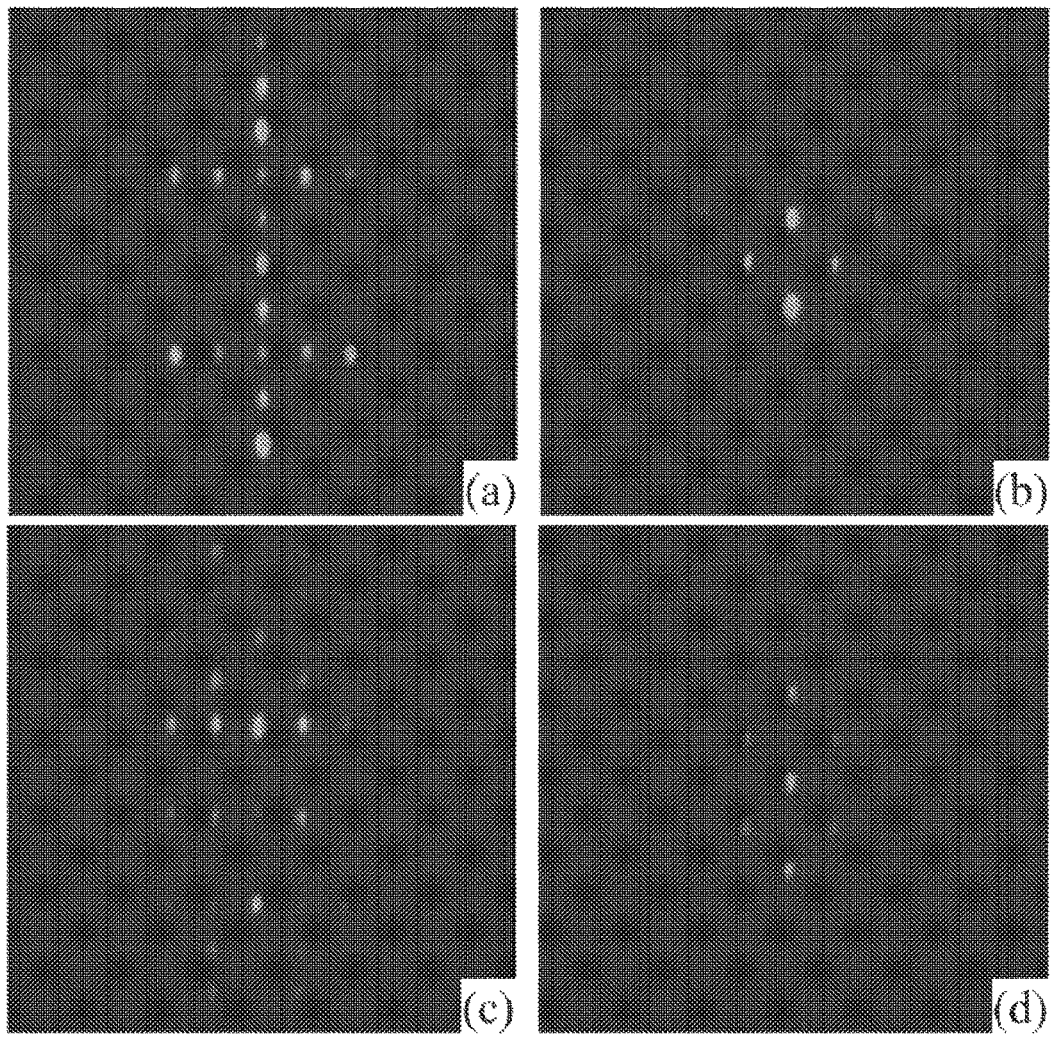
FIG. 5. Experimental observation of intensity patterns at the output of a Lieb lattice for different initial conditions: (a) Central excitation of a single waveguide, (b) Four sites with difference of phase $\pi$ (ring of Lieb), (c) Four sites with difference of phase 0, and (d) Two rings of Lieb added. Wavelength $\lambda=532$ nm. The group of FIG. 6 shows the experimental observation of the propagation of different images (patterns) propagated without diffraction in the photonic Lieb lattice, as well as a coding example.
Figure 6:
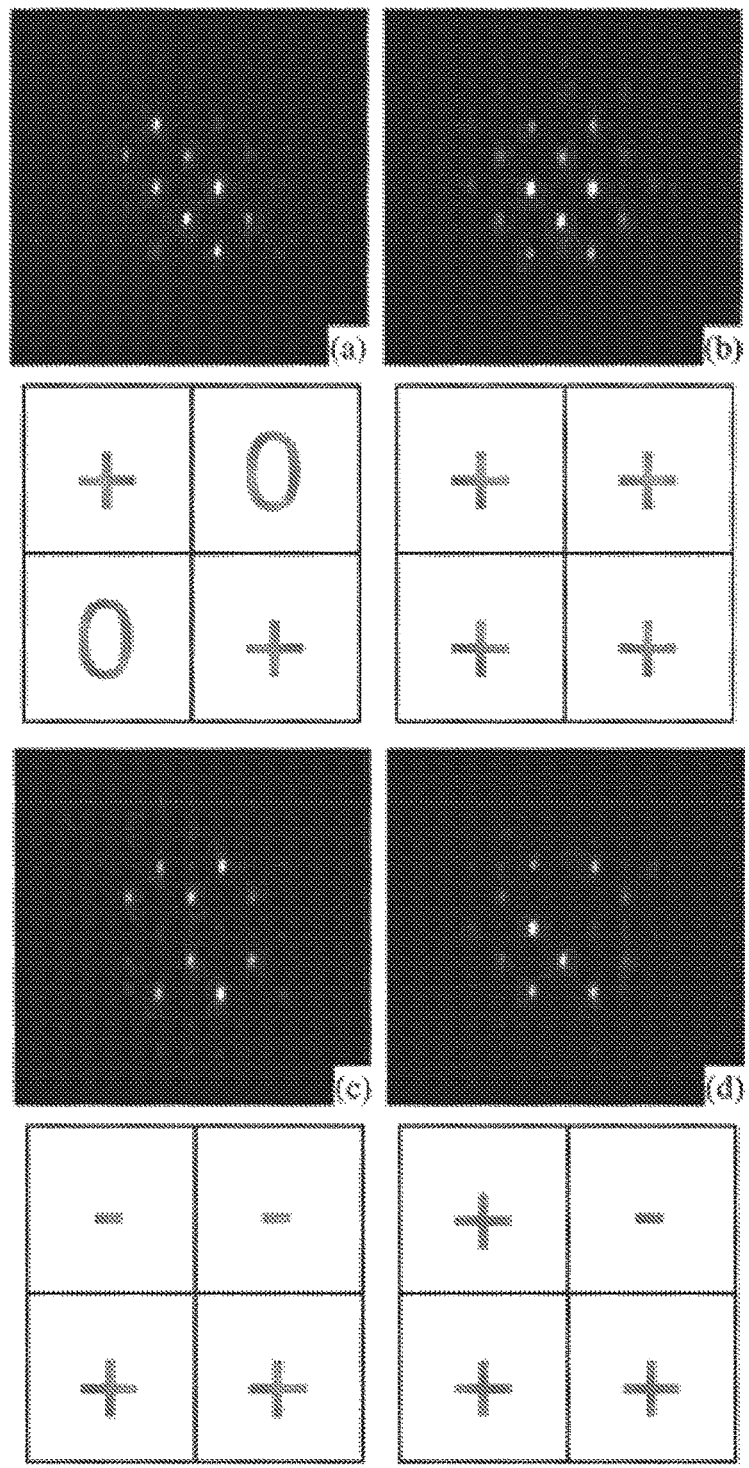
FIG. 6. Above: Experimental observation for combinations of Lieb rings in various configurations: (a) Two rings in diagonal, (b) 4 rings in sum, (c) 4 rings with horizontal sum and vertical subtraction, and (d) 4 rings with three added and one subtracted. Below: Example of a simplified outline of combinations (coding).
Figure 7:
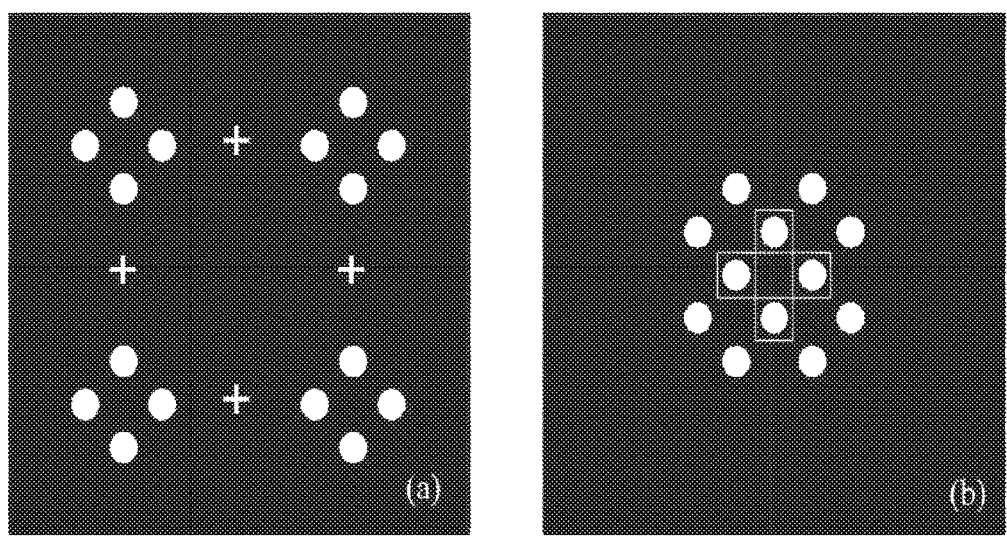
FIG. 7. Configuration of points in a pattern of 4 non-diffracting rings with different phase structure. (a) Combination of four localized rings; (b) Modes of the flat band (rings), one in each quadrant; (c) Combinations of 4 non-diffracting rings with different phase structure by coding the numbers from 0 to 9.

A control system for controlled access to a user by means of verifying a defined physical element in an optical context and of low level of power, comprising:

A setup (1) for the creation of arbitrary spatial light patterns, with control of amplitude and phase; including:

A source of light (9) which emits a LASER beam; toward a first microscope objective (11);

A spatial light modulation set (2) that receives the light of the first microscope objective (11) and said spatial light modulation set (2) sends a profile modulated in amplitude and phase which form an image to a beam splitter BS (17) that divides the image onto an initial camera CCD (6) and to a second microscope objective (12);

A defined physical element (7) which receives the initial image from the second microscope objective (12), and transmits the image without diffracting it as a final image to a third microscope objective (13);

A final camera CCD (8), receives the final image of the third microscope objective (13) and sends it to a computer (300) which compares said final image with the initial image, and performs a calculation of similarity between both images to decide to grant access to the user, if the similarity is greater than a predefined value, and deny it in case if the similarity is less than a predefined value.

Wherein the whole spatial light modulation (SLM) (2) consists of:

A first amplitude modulation set (3), formed by polarizers (30, 31), lens (14A, 14*b*), an obturator (15), a spatial light modulator (16);

A second phase modulation set (4), formed by wave retardants (40, 41, 42, 43, 44, 45); the spatial light modulator (16), a lens (14C) and mirrors (5*b*, 5*c*), wherein the light that comes from the first microscope objective (11) is directed to the first modulator amplitude set (3) wherein it is directed toward the obturator (15), crossing then the lens (14*a*), and then the polarizer (30) to reach the spatial modulator (16) in which a profile modulated in amplitude is generated. Subsequently this profile modulated in amplitude is transmitted by the polarizer (31), crossing then the lens (14*b*), the profile modulated in amplitude is redirected in opposite direction by the mirrors (5*b*, 5*c*), then said profile modulated in amplitude passes through the second phase modulation set (4) wherein it passes through the wave retardants (45, 44, 43), to reach the spatial light modulator for phase modulation (16) which generates a modulated profile in phase. Later this profile modulated in phase is transmitted by the wave retardants (42, 41, 40), and then it passes through the lens (14*c*) in order for this image with modulated amplitude and phase is directed to the beam splitter BS (17).

The profile modulated in amplitude and phase generated in the SLM (2) corresponds to a localized set of beams/points and the first, second, and third microscope objective have an amplification of 20×, 4×, 10×, respectively.

The defined physical element is a periodic system with non-conventional geometry selected from the group consisting of: photonic crystal, electronic system, cold atoms system in optical lattices, spintronics, quantum dot arrays, micro oscillators arrays, micropillar arrays, chains of proteins.

In a preferred configuration the photonic crystal (7) is selected from the group that consists of: Crystal of: Lieb, Kagome, Sawtooth, Stub, other non-homogeneous photonic crystals, wherein the photonic crystal (7) which has at least one unitary cell, wherein at least one unitary cell of the photonic crystal (7) is constituted by at least two sites with different interactions at short range. The non-conventional photonic crystal (7) presents, at least, one flat band.

In another preferred configuration the defined physical element (7) is contained inside of a protective device and light transmitter, which has the form of a cylinder and preferably is flexible, such as an optical fiber.

In another preferred configuration the protective device and light transmitter is a container box with a mobile part to let the light pass through, which can have various sizes, ideally transportable such as a card, which can be a credit card or identification card.

A control procedure for controlled access to a user by means of verifying a defined physical element in an optical and low power level context, which consists of the following stages:

(a) to decide a desired initial image, which is formed in the spatial light modulator (2), (b) observing with initial CCD camera (6) the initial image generated in (a), and check that its structure of amplitude and phase matches the desired image. If they do not match, correct the image generated by the spatial light modulator (2) until it matches the desired image;

(c) passing the modulated light beam through the defined physical element (7);

(d) observing with final CCD camera (8) the output image from the defined physical element (7);

(e) comparing with a computer (300) the coincidence of the final image captured with final CCD camera (8) with the initial image captured with initial CCD camera (6) by a calculation of similarity:

If the similarity is >=P, allow access;
If the similarity is <P, deny access; and
Wherein P=75%.

In another preferred configuration the control procedure for controlled access to a user by means of verifying a defined physical element in an optical and low level of power context is through code, comprising the following stages:

(a) Entering a defined physical element (7) between the second microscope objective (12) and the third microscope objective (13);

(b) Typing numeric code in an entry keyboard;

(c) Comparing with a computer (300), if the pattern transmitted through the defined physical element (7) coincides with the pattern of dots coded into numbers corresponding to the code typed in step (b), if match, the access is granted, otherwise the access is denied.

EXAMPLES OF APPLICATION

Example 1

Transmission of optically coded information. By the propagation of different images, it is possible to establish a language/code, whose coding and decoding can generate different types of security systems with different levels of reliability.

Example 2

Transmission of optically coded information. By the propagation of different images, it is possible to establish a logical language/code, which could serve as a basis for generating an optical information stream which will lay the foundations for a hypothetical optical computer.

Example 3

Locking plate. Associating each propagating light pattern to a letter or a number, it is possible to send and recognize a password, giving way to any security system, in particular a door lock plate, the alarm of a house, a safety deposit box, etc.

Example 4

Anti-piracy system. Similarly to example 3, it would be possible to use a code to check the veracity of a video game, a movie, etc. If the game disc would have an incorporated photonic crystal, to be inserted in the console might prove the veracity of the game. Illegally copied games would not possess this extra photonic crystal and would not be reproduced.

Example 5

ATM: Using the present invention as an interface between the user and the Automatic Teller Machine (ATM). To operate a security system using the present invention requires two basic components, an access key and a photonic crystal. Only with the presence of both components an access to ATM could be achieved. The advantage of the photonic crystal is that it could be smaller, and practically cannot be reproduced by any forger. In addition, as it does not have active components as the current magnetic cards, it would be impossible to copy or read the information contained in the crystal at the time of its use.

It is not possible by the observation of the light propagated without crystal determining the photonic crystal needed to obtain access. Advanced additional information is required in terms of geometries of crystals in physics in order to elucidate and get to deduct the needed crystal to be installed in order to achieve the propagation of the corresponding images. In fact, it is the inventors experience that in dynamics of waves in photonic crystals and skilled persons in the art around the world, that it would be practically impossible to determine the needed particular geometry for the images to be correctly propagated and that can be recognized, without knowing the geometry of the specific lattice. Geometrical or dimensions errors would cause the destruction of the incident image and the non-recognition of the pattern.

In the exposed examples it can be appreciated a strong analogy between the system of creation of a specific light pattern and a key, and between a non-conventional crystal (having a flat band) and a padlock or lock plate. Through the spatial light modulator (16) we can configure many possible combinations of rings, for example in different zones of the same crystal, allowing a very large number of possible keys for a same crystal (padlock). This would allow coding the information in patterns as complex as required to increase the security of the actuator system.

The invention claimed is:

1. A control system for controlled access to a user by verifying a defined physical element in an optical and low level of power context, the control system comprising:
   an apparatus adapted to generate spatial light patterns and to control amplitudes and phases of the spatial light patterns, the apparatus including a light source, a spatial light modulation device, a beam splitter, first, second, and third microscope objectives, first and second cameras, a photonic crystal having a Lieb lattice structure, and a computer, wherein:
   the light source is adapted to emit light toward the first microscope objective;
   the spatial light modulation device is adapted to receive the light from the first microscope objective and transmit an amplitude-and-phase-modulated profile that forms an image to the beam splitter, the beam splitter being adapted to divide the image onto the first camera and onto the second microscope objective, the second microscope objective being adapted to generate a second image;
   the photonic crystal having a Lieb lattice structure is adapted to receive the second image from the second microscope objective and transmit the second image without diffracting the second image to the third microscope objective, the third microscope objective being adapted to generate a third image; and
   the second camera is adapted to receive the third image from the third microscope objective and transmit the third image to the computer;
   wherein the computer is adapted to:
   compare the third image to the second image;
   determine a measure of similarity between the second and third images;
   grant access to the user, if the measure of similarity is greater than a predetermined value; and
   deny access if the measure of similarity is less than the predetermined value.

2. The control system of claim 1, wherein the spatial light modulation device comprises:
   a first amplitude modulation set comprising a plurality of polarizers, a lens, an obturator, and a spatial light modulator;
   a second phase modulation set comprising waves retardants; the spatial light modulator, a lens and one or more mirrors, wherein light received from the first microscope objective is directed to the first amplitude modulation set wherein the light is received by the obturator, the lens, the polarizer and the spatial light modulator, thereby generating an amplitude-modulated profile, wherein, wherein the amplitude-modulated profile is transmitted by the polarizer and received by the lens, wherein the amplitude-modulated profile and modulated in amplitude is reflected and redirected in an opposite direction by the mirrors;
   wherein the amplitude-modulated profile is received by the second phase modulator set, wherein the amplitude-modulated profile is received by and passes through the wave retardants, wherein the amplitude-modulated profile is received by the spatial light modulator, wherein the spatial light modulator generates a phase-modulated profile, wherein the phase-modulated profile is transmitted by the wave retardants and passes through the lens, thereby generating an amplitude-and-phase-modulated image wherein the amplitude-and-phase-modulated image is directed to the beam splitter.

3. The control system of claim 1, wherein the amplitude-and-phase-modulated profile corresponds to a set of localized beams/spots.

4. The control system of claim 1, wherein the first, second, and third microscope objectives have amplification 20×, 4×, 10×, respectively.

5. The system according to claim 1, wherein the photonic crystal has at least one unitary cell.

6. The system according to claim 5, wherein the at least one unitary cell of the photonic crystal comprises at least two sites with different interactions at short range.

7. The system according to claim 5, wherein the photonic crystal has at least one flat band.

8. The system according to claim 1, wherein the photonic crystal is contained inside a protective device and light transmitter.

9. The system according to claim 8, wherein the protective device and light transmitter has the shape of a cylinder.

10. The system according to claim 8, wherein the protective device and light transmitter is flexible.

11. The system according to claim 8, wherein the protective device and light transmitter comprises an optical fiber.

12. The system according to claim 11, wherein the protective device and light transmitter is a container box with a mobile part adapted to allow light to pass therethrough.

13. The system according to claim 12, wherein the protective device and light transmitter is a container box comprising a card.

14. The system according to claim 13, wherein the card is a credit card or identification card.

15. A method for controlling access by a user by verifying a defined physical element in an optical and low level of power context, the method comprising:
  determining a desired image having particular amplitude and phase characteristics;
  forming an initial image in a spatial light modulator, the initial image corresponding to the desired image;
  observing, by a first camera, the initial image; verifying that observed amplitude and phase characteristics of the initial image match the particular amplitude and phase characteristics of the desired image; If the observed amplitude and phase characteristics of the initial image do not match the particular amplitude and phase characteristics of the desired image, correcting the initial image to ensure that the initial image matches the desired image;
  passing a modulated light beam carrying the initial image through a photonic crystal having a Lieb lattice structure;
  observing, by a second camera, a final image generated by the photonic crystal; and
  determining, by a computer, a measure of similarity between the final image and the initial image;
  allowing access to the user, if the measure of similarity is greater than or equal to a predetermined value; and
  denying access to the user, if the measure of similarity is less than the predetermined value.

16. The method according to claim 15, wherein the predetermined value is 75%.

17. A method for controlling access by a user by verifying a defined physical element in an optical and low level of power context through code, the method comprising:
  placing a photonic crystal having a Lieb lattice structure between a first microscope objective and a second microscope objective;
  typing a numeric code on a keyboard; and
  determining, by a computer, if a first pattern transmitted through the photonic crystal matches a second pattern of coded dots corresponding to the numeric code; granting access, if the first and second patterns match; and denying access, if the first and second patterns do not match.

* * * * *